US012572824B1

(12) United States Patent
Warnick et al.

(10) Patent No.: US 12,572,824 B1
(45) Date of Patent: Mar. 10, 2026

(54) SYSTEM AND METHOD FOR PERSONALIZATION AND OPERATION OF A PERSONAL BOT

(71) Applicant: United Services Automobile Association (USAA), San Antonio, TX (US)

(72) Inventors: Mark Paxman Warnick, San Antonio, TX (US); Christian A. Williams, San Antonio, TX (US); Will Kerns Maney, San Antonio, TX (US); Sumita T. Jonak, San Antonio, TX (US); Joel S. Hartshorn, Port Orchard, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 660 days.

(21) Appl. No.: 17/955,227

(22) Filed: Sep. 28, 2022

Related U.S. Application Data

(60) Provisional application No. 63/249,913, filed on Sep. 29, 2021.

(51) Int. Cl.
| | |
|---|---|
| *G06N 5/022* | (2023.01) |
| *G06F 16/951* | (2019.01) |
| *H04L 51/02* | (2022.01) |

(52) U.S. Cl.
CPC .......... *G06N 5/022* (2013.01); *G06F 16/951* (2019.01); *H04L 51/02* (2013.01)

(58) Field of Classification Search
CPC .. G06N 5/22; G06N 5/12; H04L 51/02; G06F 16/951
USPC ................................................ 707/46; 706/46
See application file for complete search history.

(56) References Cited

U.S. PATENT DOCUMENTS

| | | | | |
|---|---|---|---|---|
| 2019/0205837 A1 * | 7/2019 | Tuli | ........................ | G06N 5/022 |
| 2020/0302263 A1 * | 9/2020 | Douek | .................. | G06N 20/00 |
| 2021/0049217 A1 * | 2/2021 | Ogawa | .................. | G06F 16/951 |

* cited by examiner

*Primary Examiner* — Shahid A Alam
(74) *Attorney, Agent, or Firm* — Fletcher Yoder, P.C.

(57) ABSTRACT

A personalized artificial intelligence (AI) bot system includes a computing system and one or more data sources. The one or more data sources are configured to provide data related to a user to the computing system. The system also includes a personalized bot generated by the computing system based at least upon the data related to the user and configured to navigate a network to perform interactions, wherein the personalized bot comprises AI algorithms configured to utilize the data related to the user to mimic characteristics of the user within decision making protocols to facilitate the interactions. Further, the system includes one or more additional bots configured to participate in the interactions with the personalized bot.

16 Claims, 5 Drawing Sheets

50

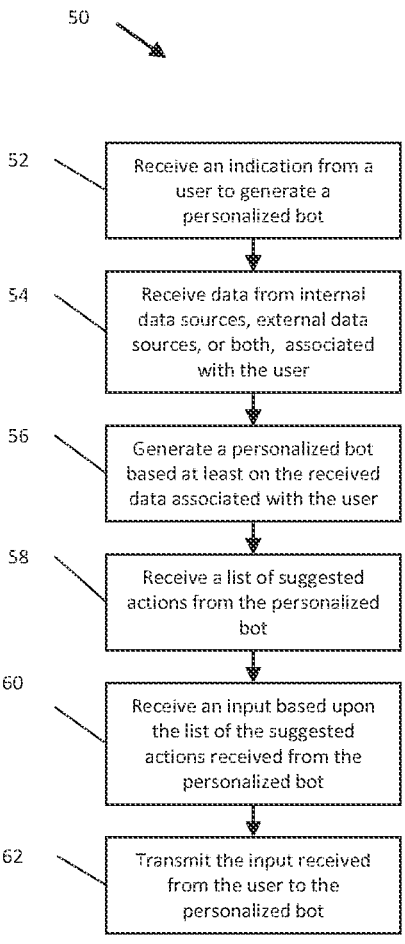

52 — Receive an indication from a user to generate a personalized bot

54 — Receive data from internal data sources, external data sources, or both, associated with the user 56 — Generate a personalized bot based at least on the received data associated with the user 58 — Receive a list of suggested actions from the personalized bot 60 — Receive an input based upon the list of the suggested actions received from the personalized bot 62 — Transmit the input received from the user to the personalized bot

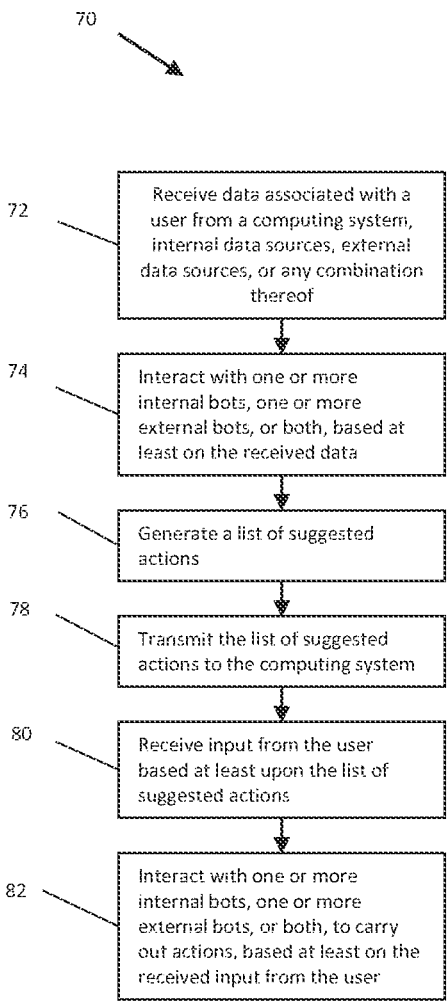

72 — Receive data associated with a user from a computing system, internal data sources, external data sources, or any combination thereof 74 — Interact with one or more internal bots, one or more external bots, or both, based at least on the received data 76 — Generate a list of suggested actions 78 — Transmit the list of suggested actions to the computing system 80 — Receive input from the user based at least upon the list of suggested actions 82 — Interact with one or more internal bots, one or more external bots, or both, to carry out actions, based at least on the received input from the user

FIG. 5

SYSTEM AND METHOD FOR PERSONALIZATION AND OPERATION OF A PERSONAL BOT

CROSS-REFERENCE TO RELATED APPLICATIONS

This application claims priority to and the benefit of U.S. Provisional Patent Application No. 63/249,913, entitled "SYSTEM AND METHOD FOR PERSONALIZATION AND OPERATION OF A PERSONAL BOT", filed Sep. 29, 2021, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Individuals and organizations are continuing to grow more and more reliant upon computer operations to function and achieve desired goals. Most entities (including individuals) rely upon access to information technology for daily operation and success. Specifically, for example, navigation of networks and associated resources (e.g., computing devices, software applications, communication portals) to perform certain operations (e.g., obtain an insurance quote, make a bank deposit, make an appointment, purchase an item) has become almost essential. Thus, it is now recognized that there is a need to facilitate such activity with improved technology features.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a personalized artificial intelligence (AI) bot system includes a computing system and one or more data sources. The one or more data sources are configured to provide data related to a user to the computing system. The system also includes a personalized bot generated by the computing system based at least upon the data related to the user and configured to navigate a network to perform interactions, wherein the personalized bot comprises AI algorithms configured to utilize the data related to the user to mimic characteristics of the user within decision making protocols to facilitate the interactions. Further, the system includes one or more additional bots configured to participate in the interactions with the personalized bot.

In an embodiment, a method performed by a computing system includes receiving an indication to generate a personalized bot for a particular user and receiving data associated with the user from internal data sources relative to the computing system, external data sources relative to the computing system, or both. Further, the method includes generating a personalized bot based at least on the data associated with the user such that the personalized bot comprises AI algorithms configured to utilize the data related to the user to mimic characteristics of the user within decision making protocols for interactions by the personalized bot. Additionally, the method includes receiving a list of suggested actions from the personalized bot based on interactions performed by the personalized bot, and presenting the list of suggested actions as output by the computing system. After providing the output, the method includes receiving an input based upon the list of the suggested actions and transmitting the input received from the user to the personalized bot.

In an embodiment, a method performed by a personalized bot comprises receiving data associated with a user from a computing system, internal data sources, external data sources, or any combination thereof and employing AI algorithms to utilize the data associated with the user to establish operational characteristics that mimic characteristics of the user within decision making protocols for interactions by the personalized bot. Further, the method includes interacting, via a network, with one or more internal bots, one or more external bots, or both, based at least on the decision making protocols and generating a plurality of action items for selection by the user based on the interacting.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

Various aspects of this disclosure may be better understood upon reading the following detailed description and upon reference to the drawings in which:

FIG. 4 is a flow chart of a process for customization and operation of a personalized bot, in accordance with aspects of the present disclosure; and FIG. 5 is a flow chart of a process for personalized bot interaction, in accordance with aspects of the present disclosure.

DETAILED DESCRIPTION

Figure 1:
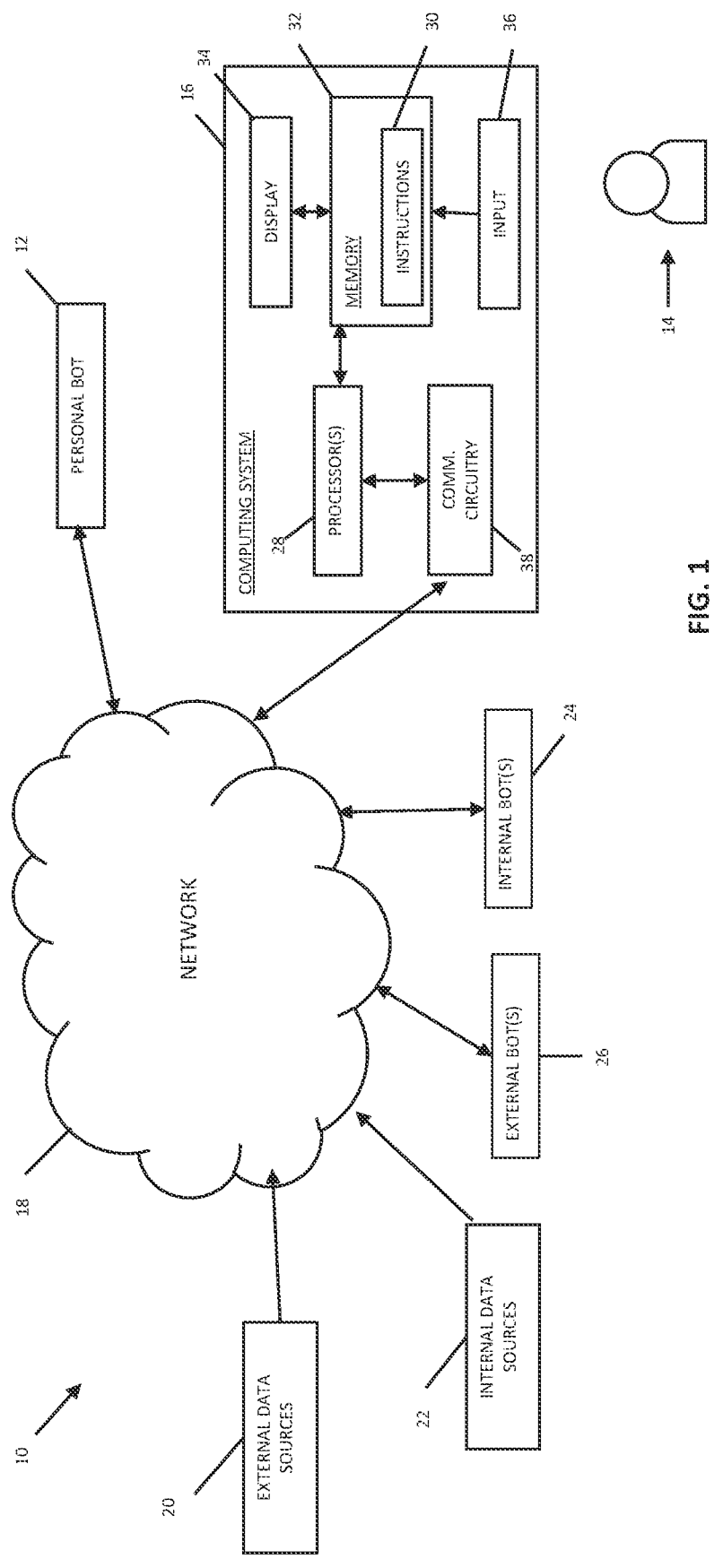
FIG. 1 is a block diagram of bots operating within a network architecture, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the term "computing system" refers to an electronic computing device such as, but not limited to, a single computer, virtual machine, virtual container, host computer, server, laptop, and/or mobile device, or to a plurality of electronic computing devices working together to perform the function described as being performed on or by the computing system. As used herein, the term "computer-readable medium" refers to one or more non-transitory, computer-readable physical media that store the contents (e.g., data or instructions) described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details. Present embodiments employ artificial intelligence or augmented intelligence for purposes of machine learning, autonomous operation and mimicry of human personalities. Artificial intelligence and augmented intelligence may be referenced as "AI" in the present disclosure.

The embodiments described herein include systems and methods for creating and utilizing personal AI bots and personal AI bot systems. In accordance with present embodiments, a personal AI bot (also referred to as a personal bot or personalized bot) may include an application or software program that employs AI (e.g., AI algorithms) and data to mimic a user (e.g., a particular individual or entity). A personal AI bot may be configured to utilize user inputs and data otherwise gathered about the user (e.g., user activity, assets controlled by the user, relationships of the user) to identify characteristics of the user that can then be used within decision making protocols and other operations (e.g., information gathering) to operate on behalf of the user. The data about the user may be based on data being linked to a user identifier (e.g., a unique user ID, user name, user number, blockchain name). Decision making protocols in accordance with present embodiments may include, for example, transactional protocols that operate to perform actual or confirmable transactions linked to a monetary account. Specifically, for example, a transactional protocol may set up payment from a bank account that can be submitted upon approval (a confirmable transaction) to acquire a collector's item or the transactional protocol may be set up to proceed with payment without approval (an actual transaction).

A personal AI bot in accordance with present embodiments includes an application or software program that operates to emulate a user's personality (e.g., operations based on user interests and historical activity) to efficiently perform tasks on behalf of the user. Specifically, the personal AI bot may be used to navigate computer networks (e.g., the internet) to identify information of interest (e.g., using an assessment protocol) to the user and to interact with systems, programs (e.g., third-person software programs), entities (e.g., corporations), websites, other bots, and so forth on behalf of the user. By performing such actions (e.g., as a background operation performed on an ongoing basis), the personal AI bot may efficiently provide useful information, opportunities, and so forth to a user with little expenditure of effort by the user. A personal AI bot may be incorporated within a personal AI bot system, which may include a host computing system configured to receive inputs from the user and data from internal and/or external data sources for characteristic identification and/or development (learning) by AI algorithms and the like.

FIG. 1 is a schematic diagram of a personal AI bot system 10. The personal AI bot system 10 may comprise a personal bot 12 (also referred to as a personalized bot 12) generated to emulate a personality of a user 14. Emulating a personality, as used in the present disclosure, may include autonomously operating (e.g., making decisions and acquiring data) in a manner that reflects the desires of the personality being emulated. Further, emulating a personality may include interfacing with other entities (e.g., other bots) to develop interests of the personality being emulated. For example, the personal bot 12 may investigate potential purchases of collectibles based on a particular user's enthusiasm for the collectibles. Such emulation may be activated based on data that is observed (e.g., received via direct or indirect input) by the personal bot 12 or communicated from the personal AI bot system 10. For example, the personal bot 12 may seek to obtain quotes for car insurance based on identification of a pending rate increase (e.g., based on scanning electronic messages of the user, scraping social media, receiving a direct user input) for the user's car insurance. The personal bot 12 may incorporate an assessment protocol as part of a decision making protocol, wherein data of interest is obtained, assembled, and presented for user evaluation (e.g., allowing a user to decide on purchases previously investigated by the personal bot 12).

In order for the personal bot 12 to accurately depict the personality of the user 14 in decision making and operation, the personal bot 12 may need to acquire data pertaining to the user 14 from numerous sources. To facilitate this, the user 14 may provide inputs to a computing system 16 that is communicatively coupled to a network 18. The network 18 may then communicate the data input by the user 14 to the personal bot 12. In addition to the user's inputs, the personal bot 12 may receive data, via the network 18, from external data sources 20, internal data sources 22, or both. The personal bot 12 may also receive data from internal bots 24 and external bots 26. In some embodiments, the personal bot 12 may reside on the computing system 16 and, therefore, receive data input directly at the computing system 16.

The computing system 16, which may be representative of numerous computing systems (e.g., a network of computers) includes one or more processors 28 that operate to perform based on instructions 30 stored on memory media 32 (e.g., a hard drive). Results of operations and communications related to the computing system 16 may be depicted on a display 34 (e.g., a computer screen). Input may be received by the computing system 16 via any of various input devices 36 (e.g., touch screens, keyboards, controllers). The input data, determinations made based on the input data, and other information can be communicated to the network 18 and other components in communication via the network 18 by communication circuitry 38 of the computing system 16. Similarly, the computing system 16 (and the personal bot 12, such as when residing on the computing system 16) may receive information via the network 18 and the communication circuitry 38 from any components in communication therewith.

Figure 2:
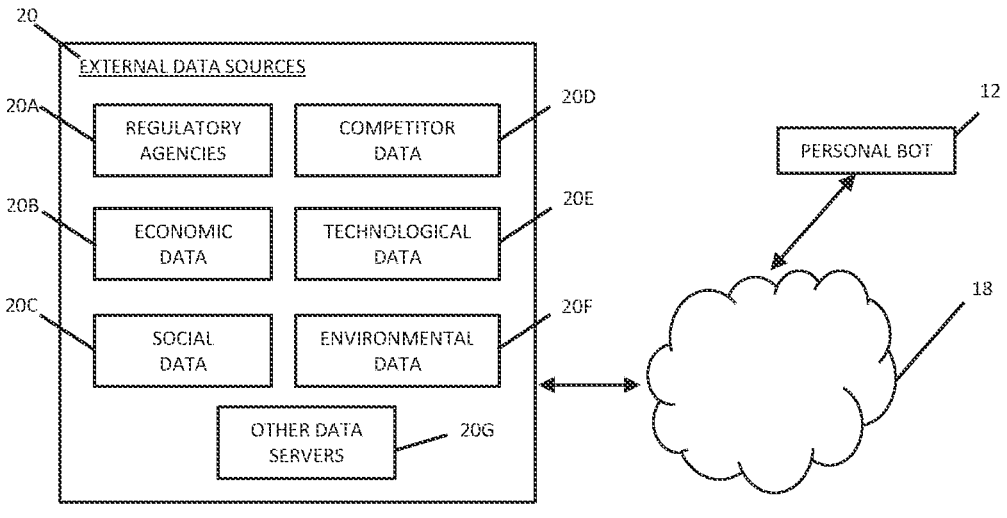
FIG. 2 is a schematic diagram of a personalized bot coordinating with external data sources, in accordance with aspects of the present disclosure.

FIG. 2 illustrates the personal bot 12 interfacing with external data sources 20 via the network 18, in accordance with present embodiments. The external data sources 20 may include, but are not limited to, any and all types of data sources that are external to a host of the personal bot 12. For example, the host of the personal bot 12 may include a computer system of origination (where the personal bot 12 is spawned), a defined information technology (IT) infrastructure, a corporate computing system, a particular server, or the like, and the external data sources 20 may include regulatory agency data sources 20A (e.g., parameters of particular regulations implemented by regulatory agencies), economic data sources 20B (e.g., product component price data, labor cost data, financial market data, currency exchange data, socioeconomic data), social data sources 20C (e.g., trends in preferences of particular social groups as determined from social media, sales data, survey data), competitor data sources 20D (e.g., publicly available data relating to competitors, sales data, financial data, news), technological data sources 20E (e.g., parameters relating to technological advancements, constraints), environmental data sources 20F (e.g., weather, recycling options, trends in environmental protection), and other types of external data sources 20G.

Figure 3:
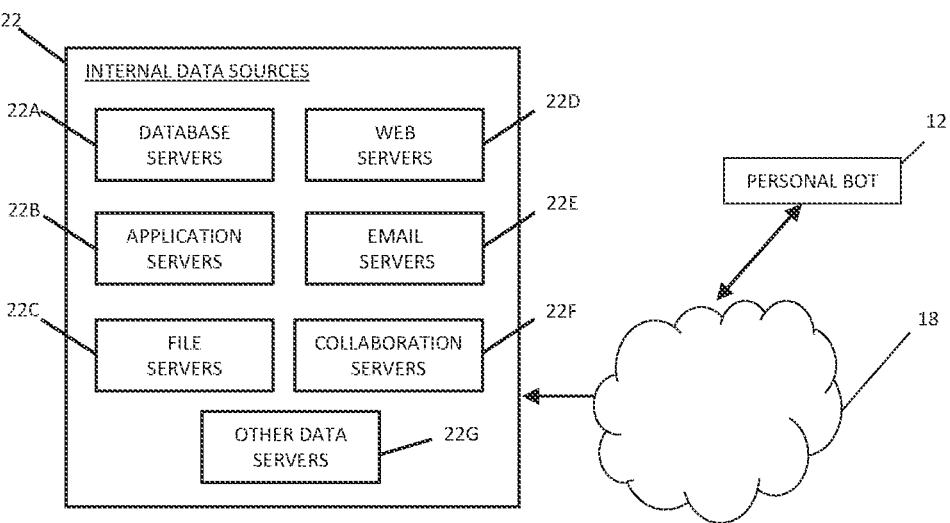
FIG. 3 is a block diagram of a personalized bot coordinating with internal data sources, in accordance with aspects of the present disclosure.

FIG. 3 illustrates the personal bot 12 interfacing with internal data sources 22 via the network 18, in accordance with present embodiments. The internal data sources 22 may include, but are not limited to, any and all types of data sources that are internal to the host of the personal bot 12. For example, the host may be IT infrastructure of a particular organization and the internal data sources 22 may include database servers 22A, application servers 22B, file servers 22C, web servers 22D, email servers 22E, collaboration servers 22F, and other types of internal data sources 22G. Because the internal data sources 22 are part of the host (e.g., a directly accessible network), data within the internal data sources 22 may be more readily accessible for training of the personal bot 12 via AI (e.g., AI programming or algorithms).

As previously noted, the personal bot 12 may be an artificial intelligence (AI) bot or an augmented intelligence (AI) bot. Therefore, the personal bot 12 may learn the personality of the user 14 based on receiving data from the user 14, the external data sources 20, the internal data sources 22, or any combination thereof. Once character traits are established, the personal bot 12 may begin to operate autonomously on behalf of the user. For example, the personal bot 12 may communicate with internal bots 24, external bots 26, or both, with minimal input (e.g., limited direct data input) from the user 14. As a specific example, if the personal bot 12 identifies and develops characteristics associated with the user 14 being a conservative investor, the personal bot 12 may interface with internal bots 24, external bots 26, or both to coordinate potential conservative investments of funds the personal bot 12 has identified as available in a banking account of the user 14. The personal bot 12 may identify savings over a certain amount that can be invested and then, based on the integrated personality of the personal bot 12, decide to research and propose investment of those savings in stocks, bonds, property, or the like.

Turning back to FIG. 1, in some embodiments, the internal bots 24 may be generated by a host (e.g., a computer system for a particular organization) for certain tasks internal to the host. For example, the internal bot 24 may be a customer service representative (CSR) bot configured to assist the personal bot 12 with inquiries regarding the host. The host may be represented by the computing system 16. In some embodiments, the internal bot 24 may be specifically generated based on the personal bot 12. That is, the internal bot 24 may be uniquely spawned to include characteristics or a personality that will coordinate well with the personal bot 12. Like the personal bot 12, the internal bot 24 may receive data regarding the user 14 from the internal data sources 22 associated with the user 14. This may allow for more streamlined and personalized interactions between the personal bot 12 and the internal bot 24. In some situations, the personal bot 12 may directly provide the internal bot 24 with information about the user 14 and/or aspects of the personal bot's operations. However, the personal bot 12 may limit or block the internal bot 24 from accessing certain information based on the characteristics or personality of the personal bot 12 and/or based on privacy limits (e.g., predefined or dynamically adjustable privacy levels, procedures, and/or regulations). The personal bot 12 may employ data sharing protocols based on privacy levels, values, or characteristics. For example, the personal bot 12 may have characteristics that suggest privacy is of high concern to the user 14 and therefore may limit access to certain data (e.g., designated privacy data, such as social security number). This may include requiring approval of the user 14 before proceeding with data sharing. For example, the personal bot 12 may employ AI to request specific input from the user 14 before sharing financial data, health data or other personal data with the internal bot 24. As a specific example, the personal bot 12 may perform some initial interactions with the internal bot 24 and even provide some limited amount of information (e.g., a product of interest for purchase) to the internal bot but not provide user-identifying information to the internal bot 24 until specific approval has been received from the user 14 via an input, which may be prompted (e.g., via a message on the display 34) by the personal bot 12.

The external bots 26 may be generated by entities external to the host (e.g., a particular organization) for certain tasks external to the particular organization. For example, the external bot 26 may be generated by an external organization associated with password security (i.e., a password manager). The external bot 26 may receive data from the external and/or internal data sources 20, 22 associated with the user 14. For example, the external bot 26 may acquire publicly available data or data that the personal bot 12 provides or allows the external bot 26 to access. Moreover, the external bot 26 may use the received data to make a determination as to whether the user's passwords that are stored within the external organization are secure. Once the determination is made, the external bot 26 may suggest modifications to the user's existing passwords to the personal bot 12. The personal bot 12 may communicate the suggestions to the computing system 16 such that the user 14 may accept, or deny the suggestions via the computing system 16. The personal bot 12 may then communicate the user's decision to the external bot 26 such that the external bot 26 performs actions based on the user's input. In some embodiments, the personal bot 12 may develop characteristics that enable the personal bot 12 to make such decisions autonomously and without requiring confirmation from the user 14.

In some embodiments, the computing system 16 may include other processing circuitry such as one or more processors 28 configured to execute instructions 30 stored in memory media 32 of the computing system 16, wherein the instructions 30, when executed by the one or more processors 28, enable the computing system 16 to input data relating to one or more processes of the organization using, for example, one or more displays 34 and one or more input devices 36 (e.g., mice, keyboards, touchscreens, cameras, and so forth).

In certain embodiments, the one or more processors 28 of the computing system 16 may be any suitable type of computer processors or microprocessors capable of executing computer-executable code. In certain embodiments, the memory media 32 of the computing system 16 may be any suitable articles of manufacture that can serve as media to store processor-executable code, data, or the like. These articles of manufacture may represent computer-readable media (e.g., any suitable form of memory or storage) that may store processor-executable code (e.g., the instructions 30) executed by the one or more processors 28 to perform the presently disclosed techniques. In certain embodiments, the memory media 32 of the computing system 16 may represent tangible, non-transitory computer-readable media (e.g., any suitable form of memory or storage) that may store the processor-executable code used by the one or more processors 28 to perform various techniques described herein. It should be noted that non-transitory merely indicates that the media is tangible and not a signal. It should be noted that the components described above with regard to the computing system 16 are exemplary components, and the computing system 16 may include additional or fewer components in certain embodiments.

In addition, in certain embodiments, the computing system 16 may include communication circuitry 38 configured to facilitate communication between the respective computing system 16 and other computing devices including, but not limited to other computing systems (as may generally be represented by computer system 16) associated with other users of the organization, as well as external and internal data sources 20, 22. In particular, in certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 18. Such communications enable the personal bot 12 to interface with programs, systems, other bots, and the like. It should be noted that the internal bots 24 and the external bots 26 may be resident on, associated with, and/or generated by respective computing systems, as generally represented by computing system 16.

FIG. 4 is a flow diagram of a method 50 of the computing system 16 generating and communicating with the personalized bot 12. As illustrated, in certain embodiments, the method 50 includes the computing system 16 receiving an indication from the user 14 to generate a personalized bot 12 (block 52). The user 14 may be an end user or a representative. In fact, the user 14, in certain embodiments, may be an automated program that initiates generation of personalized bots for individuals. For example, upon registering an individual with a service, an associated program may initiate generation of a personalized bot for the individual and the individual may accept or decline use of such a bot at a later time. In addition, the method 50 may include the computing system 16 receiving data from internal data sources 22, external data sources 20, or both, associated with the user (block 54). The computing system 16 may generate the personalized bot 12 based at least on the received data associated with the user 14 (block 56). The personalized bot 12 may interact with other bots, both internal and external to the particular organization and perform preliminary operations (e.g., assessments, research, initial engagements) and/or generate a list of suggested actions (e.g., interfaces, data acquisitions, transactions, purchases), as described above. The computing system 16 may receive the list of suggested actions from the personalized bot 12 (block 58) and prompt the user 14 to provide an input. The computing system 16 may receive an input based upon the list of suggested actions (block 60) and then transmit the input to the personalized bot 12 (block 62). In addition to assisting the user in performance of tasks (e.g., searching a network for data of interest to the user, filling out forms on behalf of the user), the personalized bot 12 may also use data (e.g., user confirmations) acquired during the performance of these tasks to further develop the AI to better reflect the personality of the user 14. As an example, a list of suggested actions may include a list of suggested transactions (e.g., various optional purchases primed for completion by the personalized bot 12), which may be submitted for user observation and selection. Upon selection of certain transactions from the list (e.g., based on input from the user), the selected transactions may be carried out by the personalized bot 12.

FIG. 5 is a flow diagram of a method 70 of the personalized bot 12 emulating the user's personality and interacting with other entities on behalf of the user 14, as described herein. As illustrated, the method 70 includes the personalized bot 12 receiving data associated with the user 14 from the computing system 16, the internal data sources 22, the external data sources 20, or any combination thereof (block 72). The received data may be incorporated by AI algorithms of the personalized bot 12 to assist the personalized bot 12 in emulating the user's personality more accurately. The personalized bot 12 may then interact with one or more internal bots 24, one or more external bots 26, or both, based at least on the received data (block 74). The interaction with the other bots may enable the personalized bot 12 to generate a list of suggested actions (block 76) to transmit to the computing system 16 (block 78). The user 14 may provide input to the computing system 16 based on the suggested list of actions and the personalized bot 12 may receive the input (block 80). Acting in the best interest of the user 14, the personalized bot 12 may interact with one or more internal bots 24, one or more external bots 26, or both, to carry out actions, based at least on the received input from the user 14 (block 82).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A personalized artificial intelligence (AI) bot system, comprising:
    a computing system configured to operate to;
        receive data related to a user from one or more data sources, and wherein the data comprises internal data, wherein internal data comprises privacy data;
        generate a personalized bot based at least upon the internal data related to the user;
        instruct the personalized bot to navigate a network to perform interactions with one or more additional bots, wherein the personalized bot comprises AI algorithms configured to utilize the data related to the user to mimic characteristics of the user within decision making protocols to facilitate the interactions without sharing the privacy data;
        request approval from the user to share the privacy data based on the interactions;
        select a transaction via the one or more additional bots using the privacy data responsive to the user approving the request;
        receive privacy data wherein the privacy data comprises a user identity; and
        instruct one or more additional bots, wherein the one or more additional bots comprise password management bots, to request approval from the user for a password change based on the privacy data.

2. The system of claim 1, wherein the one or more data sources are internal data sources, external data sources, or both.

3. The system of claim 2, wherein the one or more data sources are internal data sources comprising database servers, application servers, file servers, web servers, email servers, and/or collaboration servers.

4. The system of claim 2, wherein the one or more data sources are external data sources comprising regulatory agency data sources, economic data sources, social data sources, competitor data sources, technological data sources, and/or environmental data sources.

5. The system of claim 1, wherein the decision making protocols include transactional protocols configured to perform actual or confirmable transactions linked to a monetary account.

6. The system of claim 1, wherein the decision making protocols include assessment protocols configured to obtain data of interest, assemble the data of interest, and present the assembled data of interest to the user for evaluation.

7. The system of claim 6, wherein the data of interest is identified via the personalized bot via navigation of the network and based on the data related to the user.

8. The system of claim 1, wherein the one or more additional bots are configured to interface specifically with the personalized bot based on data acquired directly from the personalized bot or acquired from separate sources having data about the user.

9. The system of claim 1, wherein the personalized bot is configured to identify a hobby of the user, an investment strategy of the user, or a likely need of the user based on the data related to the user and configured to interface with the one or more additional bots based on the hobby, the investment strategy, and/or the likely need.

10. The system of claim 1, wherein the personalized bot is configured to identify a likely need for additional insurance based on the data related to the user indicating that existing insurance for the user is going to expire within a timeframe and configured to acquire insurance quotes corresponding to the existing insurance via the network in response to identifying the likely need.

11. The system of claim 1, wherein the personalized bot is configured to acquire data of interest to the user by navigating the network and interfacing with a plurality of data sources identified by the personalized bot as likely sources of the data of interest to the user based on the data related to the user.

12. A method performed by a computing system, the method comprising:
    receiving an indication to generate a personalized bot for a particular user;
    receiving data related to the user from one or more data sources, and wherein the data comprises internal data, wherein the internal data comprises privacy data;
    generating a personalized bot based at least on the internal data related to the user;
    instructing the personalized bot to navigate a network to perform interactions with one or more additional bots, wherein the personalized bot comprises AI algorithms configured to utilize the data related to the user to mimic characteristics of the user within decision making protocols to facilitate the interactions without sharing the privacy data;
    requesting approval from the user to share the privacy data based on the interactions;
    selecting a transaction via the one or more additional bots using the privacy data responsive to the user approving the request;
    receiving privacy data wherein the privacy data comprises a user identity; and
    instructing one or more additional bots, wherein the one or more additional bots comprise password management bots, to request approval from the user for a password change based on the privacy data.

13. The method of claim 12, wherein the data associated with the user comprises data linked to the user identity in the internal data sources, the external data sources, or both.

14. A method performed by a personalized bot, the method, comprising:
    receiving data related to a user from one or more data sources, and wherein the data comprises internal data, wherein the internal data comprises privacy data;
    receiving privacy data, wherein the privacy data comprises a user identity;
    employing AI algorithms to utilize the data related to the user to establish operational characteristics that mimic characteristics of the user within decision making protocols to facilitate interactions by the personalized bot without sharing the privacy data;
    interacting, via a network, with one or more additional bots on the decision making protocols;
    interacting, via a network, with one or more additional bots, wherein the one or more additional bots comprise password management bots; and
    generating a plurality of action items for selection by the user based on the interacting, wherein at least one action item for selection is a suggested password change based on the privacy data.

15. The method of claim 14, wherein generating the plurality of action items comprises:
    generating a list of suggested transactions;

submitting the list of suggested transactions for presentation;

receiving input indicating a selected transaction of the suggested transactions on the list; and carrying out the selected transaction.

16. The method of claim 14, comprising interacting with the one or more internal bots, the one or more external bots, or both, based at least on the decision making protocols to provide options for addressing the likely need.

\* \* \* \* \*